United States Patent
Gladnick

(10) Patent No.: US 9,143,674 B2
(45) Date of Patent: Sep. 22, 2015

(54) MACHINE VISION INSPECTION SYSTEM AND METHOD FOR PERFORMING HIGH-SPEED FOCUS HEIGHT MEASUREMENT OPERATIONS

(71) Applicant: Mitutoyo Corporation, Kawasaki-shi, Kanagawa-ken (JP)

(72) Inventor: Paul Gerard Gladnick, Seattle, WA (US)

(73) Assignee: Mitutoyo Corporation, Kawasaki-shi (JP)

(*) Notice: Subject to any disclaimer, the term of this patent is extended or adjusted under 35 U.S.C. 154(b) by 289 days.

(21) Appl. No.: 13/917,581

(22) Filed: Jun. 13, 2013

(65) Prior Publication Data

US 2014/0368726 A1   Dec. 18, 2014

(51) Int. Cl.
- *H04N 5/232* (2006.01)
- *G01B 11/06* (2006.01)
- *G06T 7/00* (2006.01)

(52) U.S. Cl.
CPC ........ *H04N 5/23212* (2013.01); *G01B 11/0608* (2013.01); *G06T 7/0004* (2013.01)

(58) Field of Classification Search
None
See application file for complete search history.

(56) References Cited

U.S. PATENT DOCUMENTS

| | | | |
|---|---|---|---|
| 5,790,710 A | 8/1998 | Price | |
| 6,542,180 B1 | 4/2003 | Wasserman | |
| 6,785,469 B1 * | 8/2004 | Ide et al. | 396/121 |
| 7,324,682 B2 | 1/2008 | Wasserman | |
| 7,454,053 B2 | 11/2008 | Bryll | |
| 8,111,905 B2 | 2/2012 | Campbell | |
| 8,111,938 B2 | 2/2012 | Bryll | |
| 2005/0089241 A1 * | 4/2005 | Kawanishi et al. | 382/274 |
| 2005/0109959 A1 * | 5/2005 | Wasserman et al. | 250/559.19 |
| 2008/0100829 A1 | 5/2008 | Watson | |
| 2010/0177951 A1 | 7/2010 | Vodanovic | |
| 2011/0133054 A1 | 6/2011 | Campbell | |

FOREIGN PATENT DOCUMENTS

DE    10 2006 004 060 A1    8/2007

OTHER PUBLICATIONS

Geusebroek, J.-M., and A. Smeulders, "Robust Autofocusing in Microscopy," ISIS Technical Report Series, vol. 17, Intelligent Sensory Information Systems Group, University of Amsterdam, Nov. 2000, 20 pages.

(Continued)

*Primary Examiner* — Thomas Conway
(74) *Attorney, Agent, or Firm* — Christensen O'Connor Johnson Kindness PLLC

(57) ABSTRACT

A machine vision inspection system comprising an illumination source and an imaging system and a method for performing high-speed focus height measurement operations. The method comprises: placing a workpiece in a field of view of the machine vision inspection system; determining a region of interest for focus height measurement operations; operating the illumination source to illuminate the workpiece with strobed illumination; periodically modulating a focus position of the imaging system along a Z-height direction proximate to the workpiece; collecting an image stack, wherein each image of the image stack corresponds to an instance of strobed illumination matched with a phase of the modulated focus position corresponding to an appropriate Z height within the image stack; and determining a Z-height measurement for at least one portion of the region of interest.

18 Claims, 10 Drawing Sheets

(56) References Cited

OTHER PUBLICATIONS

Mermillod-Blondin, A., "High-Speed Varifocal Imaging With a Tunable Acoustic Gradient Index of Refraction Lens," Optics Letters 33(18):2146-2148, Sep. 15, 2008.
"QVPAK 3D CNC Vision Measuring Machine: Operation Guide," Version 2.0, Manual No. 4911GB, Series No. 359, Mitutoyo Corporation & Micro Encoder Inc., Kanagawa, Japan, Sep. 1996, 86 pages.
"QVPAK 3D CNC Vision Measuring Machine: User's Guide," Version 7.0, 1st ed., Manual No. 99MCB225A1, Series No. 359, Mitutoyo Corporation & Micro Encoder Inc., Kanagawa, Japan, Jan. 2003, 370 pages.
Extended European Search Report mailed Oct. 21, 2014, issued in EP Application No. 14170484.1, filed May 29, 2014, 7 pages.

* cited by examiner

MACHINE VISION INSPECTION SYSTEM AND METHOD FOR PERFORMING HIGH-SPEED FOCUS HEIGHT MEASUREMENT OPERATIONS

FIELD

The invention relates generally to machine vision inspection systems, and more particularly to height measurements from focus operations.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions to allow workpiece inspection. One exemplary prior art system, that can be characterized as a general-purpose "off-line" precision vision system, is the commercially available QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This type of system is able to use a microscope-type optical system and move the stage so as to provide inspection images of either small or relatively large workpieces at various magnifications.

General-purpose precision machine vision inspection systems, such as the QUICK VISION™ system, are also generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools. One known type of video tool is a "multipoint tool" or a "multipoint autofocus tool" video tool. Such a tool provides Z-height measurements or coordinates (along the optical axis and focusing axis of the camera system) derived from a "best focus" position for a plurality of sub-regions at defined X-Y coordinates within a region of interest of the tool, such as determined by an autofocus method. A set of such X,Y,Z coordinates may be referred as point cloud data, or a point cloud, for short. In general, according to prior art autofocus methods and/or tools, the camera moves through a range of positions along a Z-axis (the focusing axis) and captures an image at each position (referred to as an image stack). For each captured image, a focus metric is calculated for each sub-region based on the image and related to the corresponding position of the camera along the Z-axis at the time that the image was captured. This results in focus curve data for each sub-region, which may be referred to simply as a "focus curve" or "autofocus curve." The peak of the focus curve, which corresponds to the best focus position along the z-axis, may be found by fitting a curve to the focus curve data and estimating the peak of the fitted curve. Variations of such autofocus methods are well known in the art. For example, one known method of autofocusing similar to that outlined above is discussed in "Robust Autofocusing in Microscopy," by Jan-Mark Geusebroek and Arnold Smeulders in ISIS Technical Report Series, Vol. 17, November 2000. Another known autofocus method and apparatus is described in U.S. Pat. No. 5,790,710, which is hereby incorporated by reference in its entirety.

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as autofocus video tools.

Video tools (or "tools" for short) and other graphical user interface features may be used manually to accomplish manual inspection and/or machine control operations (in "manual mode"). Their set-up parameters and operation can also be recorded during learn mode, in order to create automatic inspection programs, or "part programs." Video tools may include, for example, edge-/boundary-detection tools, autofocus tools, shape- or pattern-matching tools, dimension-measuring tools, and the like.

In various applications it is desirable to perform high speed autofocus operations to facilitate high-speed 3-D measurements in either stationary or non-stop moving inspection systems. Laser triangulation techniques may provide a 2000:1 range-to-resolution ratio, but typical systems employing such techniques have a lower limit of 4 µm resolution for Z-height measurements and do not provide comparable lateral resolution to exemplary machine vision inspection systems. The speed of autofocus operations in conventional machine vision inspection systems is limited by the motion of the camera through a range of Z-height positions. There is a need for improved autofocus operations utilizing alternative methods of collecting a stack of images for measuring Z-height positions with high speed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
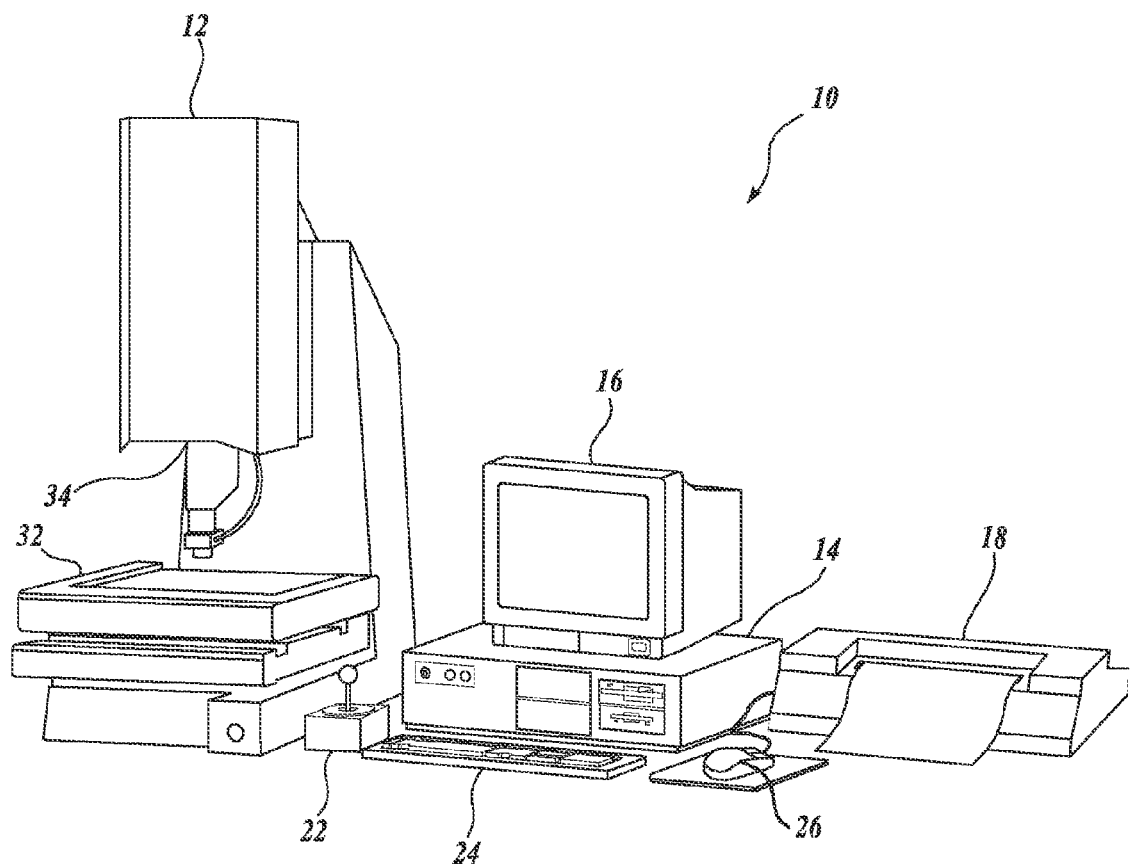
FIG. 1 is a diagram showing various typical components of a general-purpose precision machine vision inspection system.

FIG. 1 is a block diagram of one exemplary machine vision inspection system 10 usable in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various embodiments, a touchscreen tablet or the like may be substituted for and/or redundantly provide the functions of any or all of the computer system 14, the display 16, the joystick 22, a keyboard 24, and the mouse 26.

Those skilled in the art will appreciate that the controlling computer system 14 may generally consist of any computing system or device. Suitable computing systems or devices may include personal computers, server computers, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053; 7,324,682; 8,111,905; and 8,111,938, each of which is incorporated herein by reference in its entirety.

Figure 2:
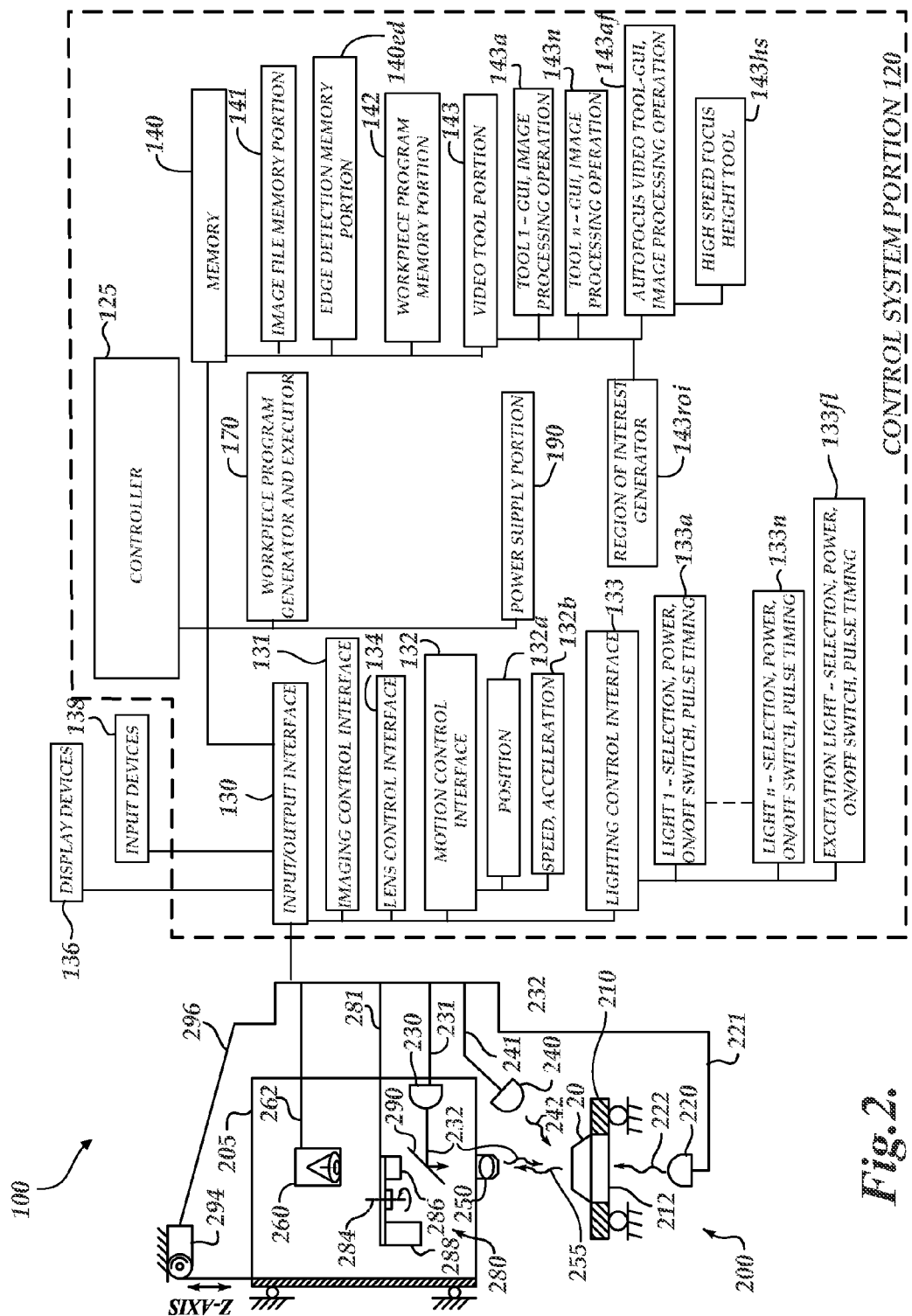
FIG. 2 is a block diagram of a control system portion and a vision components portion of a machine vision inspection system similar to that of FIG. 1 and including features disclosed herein.

FIG. 2 is a block diagram of a control system portion 120 and a vision components portion 200 of a machine vision inspection system 100 similar to the machine vision inspection system of FIG. 1, and including features as described herein. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included.

The optical assembly portion 205 is controllably movable along a Z axis that is generally orthogonal to the X and Y axes by using a controllable motor 294 that drives an actuator to move the optical assembly portion 205 along the Z axis to change the focus of the image of the workpiece 20. The controllable motor 294 is connected to the input/output interface 130 via a signal line 296.

A workpiece 20, or a tray or fixture holding a plurality of workpieces 20, which is to be imaged using the machine vision inspection system 100 is placed on the workpiece stage 210. The workpiece stage 210 may be controlled to move relative to the optical assembly portion 205, such that the interchangeable objective lens 250 moves between locations on a workpiece 20, and/or among a plurality of workpieces 20. One or more of a stage light 220, a coaxial light 230, and a surface light 240 (e.g., a ring light) may emit source light 222, 232, and/or 242, respectively, to illuminate the workpiece or workpieces 20. The light source 230 may emit light 232 along a path including a mirror 290. The source light is reflected or transmitted as workpiece light 255, and the workpiece light used for imaging passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens through a signal line or bus 281.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132a, and a speed/acceleration control element 132b although such elements may be merged and/or indistinguishable. The lighting control interface 133 includes lighting control elements 133a, 133n, and 133fl that control, for example, the selection, power, on/off switch, and strobe pulse timing, if applicable, for the various corresponding light sources of the machine vision inspection system 100.

The memory 140 may include an image file memory portion 141, an edge detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic and/or manual operations that define various ROIs that are operable in various video tools included in the video tool portion 143. The video tool portion also includes an autofocus video tool 143af which determines the GUI, image-processing operation, etc., for focus height measurement operations. The autofocus video tool 143af additionally includes a high-speed focus height tool 143hs that may be utilized to measure focus heights with high speed according to operations described with respect to FIGS. 3-9, using hardware described in FIG. 3. In some embodiments, the high-speed focus height tool 143hs may be a special mode of the autofocus video tool 143af that may otherwise operate according to conventional methods for autofocus video tools. In some embodiments, the operations of the autofocus video tool 143af may only include those of the high-speed focus height tool 143hs. In the context of this disclosure, and as known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool with the underlying operations being included implicitly.

The signal lines or busses 221, 231, and 241 of the stage light 220, the coaxial lights 230 and 230', and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface that may include various graphical user interface (GUI) features that are usable to perform inspection operations, and/or to create and/or modify part programs, to view the images captured by the camera system 260, and/or to directly control the vision system components portion 200. The display devices 136 may display user interface features associated with the autofocus video tool 143af.

In various exemplary embodiments, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

Figure 3:
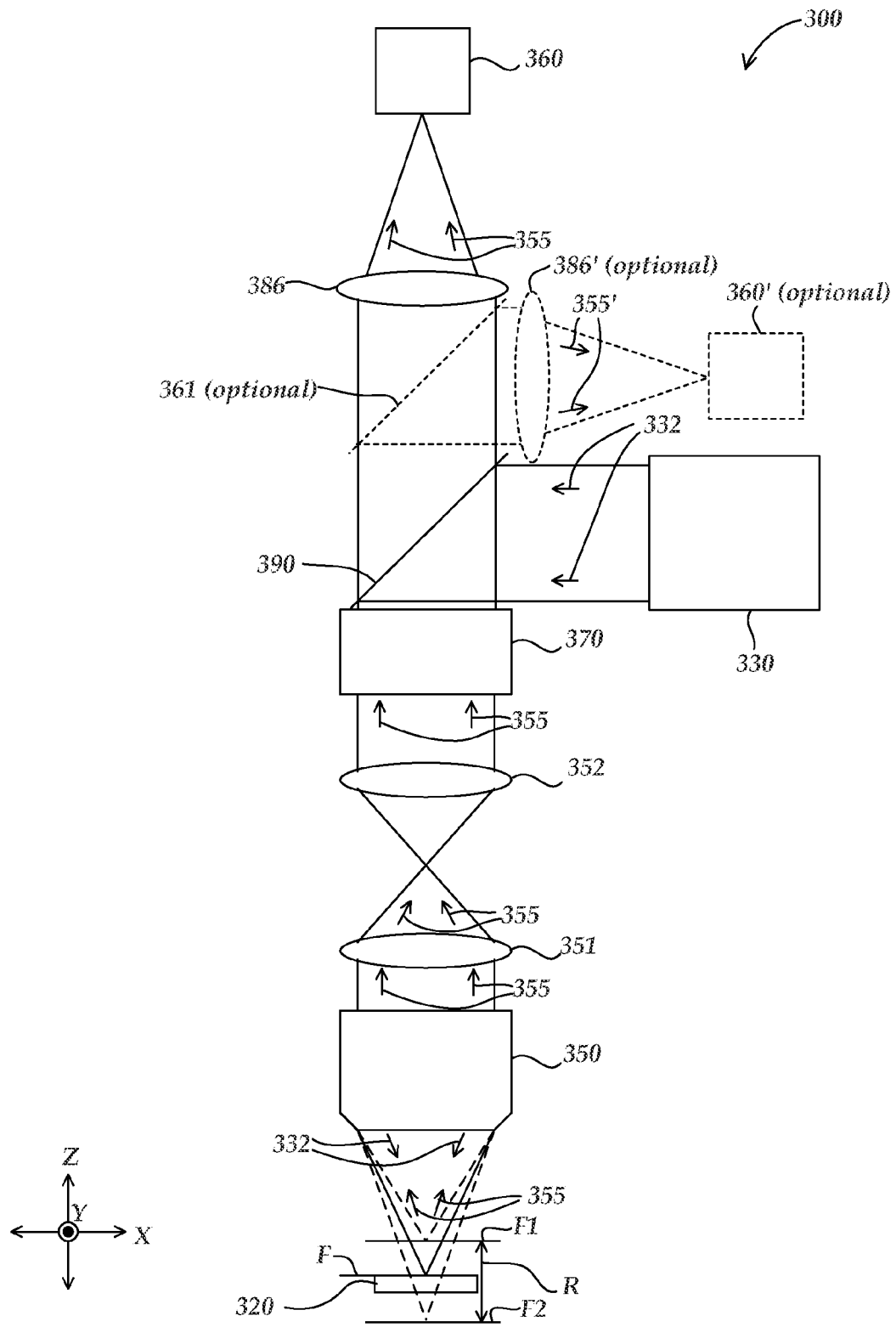
FIG. 3 shows a schematic diagram of an imaging system that may be adapted to a machine vision inspection system and operated according to the principles disclosed herein.

FIG. 3 shows a schematic diagram of an imaging system 300 that may be adapted to a machine vision inspection system and operated according to the principles disclosed herein. The imaging system 300 is configured to collect an image stack to measure Z heights based on a best focus image in the image stack. The imaging system 300 comprises a light source 330 that is configurable to illuminate a workpiece with strobed illumination in a field of view of the imaging system 300, an objective lens 350, a relay lens 351, a relay lens 352, a variable focal length lens 370, a tube lens 386, and a camera system 360.

In operation, the light source 330 is configured to emit source light 332 along a path including a mirror 390 to a surface of a workpiece 320, the objective lens 350 is configured to receive workpiece light 332 that is focused at a focal plane F proximate to the workpiece 320, and output the workpiece light 355 to the relay lens 351. The relay lens 351 is configured to receive the workpiece light 355 and output it to the relay lens 352. The relay lens 352 is configured to receive the workpiece light 355 and output it to the variable focal length lens 370. Together, the relay lens 351 and the relay lens 352 provide a 4f optical relay between the objective lens 350 and the variable focal length lens 370 in order to provide constant magnification for each Z height. The variable focal length lens 370 is configured to receive the workpiece light 355 and output it to the tube lens 386. The variable focal length lens 370 is electronically controllable to vary the focus position of the imaging system and collect an image stack comprising respective images focused at respective Z heights, wherein each image of the image stack corresponds to an instance of strobed illumination timed to correspond with a phase of the periodically modulated focus position corresponding to a Z height within the image stack.

In various embodiments, a machine vision inspection system adapted to the principles disclosed herein is configurable to determine a region of interest within a field of view for focus height measurement operations and determine a Z-height measurement for at least one portion of the region of interest based on analyzing the image stack to determine a Z height corresponding to a best focus position for the at least one portion of the region of interest. The position of the focal plane F may be moved within a range R bound by a focal plane F1 and a focal plane F2. In various embodiments, a machine vision inspection system comprises a control system (e.g., the control system 200) that is configured to control the variable focal length lens 370 to periodically modulate a focus position of the imaging system 300. In some embodiments, the variable focal length lens 370 may modulate the focus position at a rate of at least 20 kHz. In some embodiments, the range R may be as large as 300 μm. The variable focal length lens 370 is advantageous in that it does not require any adjustment of the distance between the objective lens 350 and the workpiece 320. This allows for high speed in collecting an image stack for measuring a Z height of a portion of the workpiece 320 based on a best focus height, the speed of which is limited primarily by the frame rate of the camera system 360.

In some embodiments, the variable focal length lens 370 is a tunable acoustic gradient index of refraction lens. A tunable acoustic gradient index of refraction lens is a high-speed variable focal length lens that uses sound waves in a fluid medium to modulate a focus position and may periodically sweep a range of focal lengths at a frequency of several hundred kHz. Such a lens may be understood by the teachings of the article, "High-speed varifocal imaging with a tunable acoustic gradient index of refraction lens" (Optics Letters, Vol. 33, No. 18, Sep. 15, 2008), which is hereby incorporated by reference in its entirety.

In some embodiments, the camera system 360 may comprise a sensor with a global shutter, i.e., a sensor, that exposes each pixel simultaneously. Such an embodiment is advantageous in that it provides the capability to measure image stacks without motion of a workpiece or any part of the imaging system 300.

In some embodiments, the camera system 360 may comprise a sensor with an electronic rolling shutter (ERS) system. For example, the camera system may comprise a black and white CMOS sensor using SXGA resolution coupled with an electronic rolling shutter (ERS) system (e.g., model MT9M001 from Aptina Imaging of San Jose, Calif.). The maximum number of images in a stack is limited by the ratio of the vertical resolution of the CMOS sensor to the width of pixel arrays used for determining a contrast metric. For example, a CMOS sensor with SXGA resolution has a resolution of 1280×1024 pixels. Thus, for focus operations using 7×7 pixel sub-regions, this limits the number of images per stack to 146 images. A higher resolution sensor such as a 2592×1944 HD+ sensor allows for wider sub-regions, e.g., 13×13 sub-regions for an image stack of 146 images. Alternatively, a higher resolution sensor with a 2592×1944 resolution may utilize 7×7 pixel sub-regions for an image stack of 278 images. Such embodiments will be described in further detail with respect to FIG. 4.

In some embodiments, the variable focal length lens 370 may be driven sinusoidally such that the optical power of the variable focal length lens 370 is modulated sinusoidally. In exemplary embodiments, a tunable acoustic gradient index of refraction lens may be configured for focal scanning rates as high as 400 kHz. The maximum number of images in a stack is limited by the period with which the variable focal length lens 370 is modulated and the length of time of light pulse durations associated with each image exposure. For a focus modulation period of 13.9 μs and a light pulse duration of 50 ns, this limits the number of images per stack to 275. The vertical line scanning frequencies of image detectors such as that of Aptina are on the order of kHz. For example, the model MT9M001 from Aptina may be configured for a line scan frequency of 37.5 kHz (based on a data scan rate of 48 MHz over 1280 pixels). Such detectors must be configured such that the frequency is less than the modulation frequency of the variable focal length lens 370.

In some embodiments, the imaging system 300 may comprise an optional beamsplitter 361, an optional tube lens 386', and an optional second camera system 360'. In operation, the beamsplitter 361 is configured to split the workpiece light 355 and output workpiece light 355' to the tube lens 386'. The tube lens 386' is configured to output the workpiece light 355' to the camera 360' in order to provide an additional image of the field of view of the machine vision inspection system. A detailed configuration of such a system is illustrated in FIG. 4.

Figure 4:
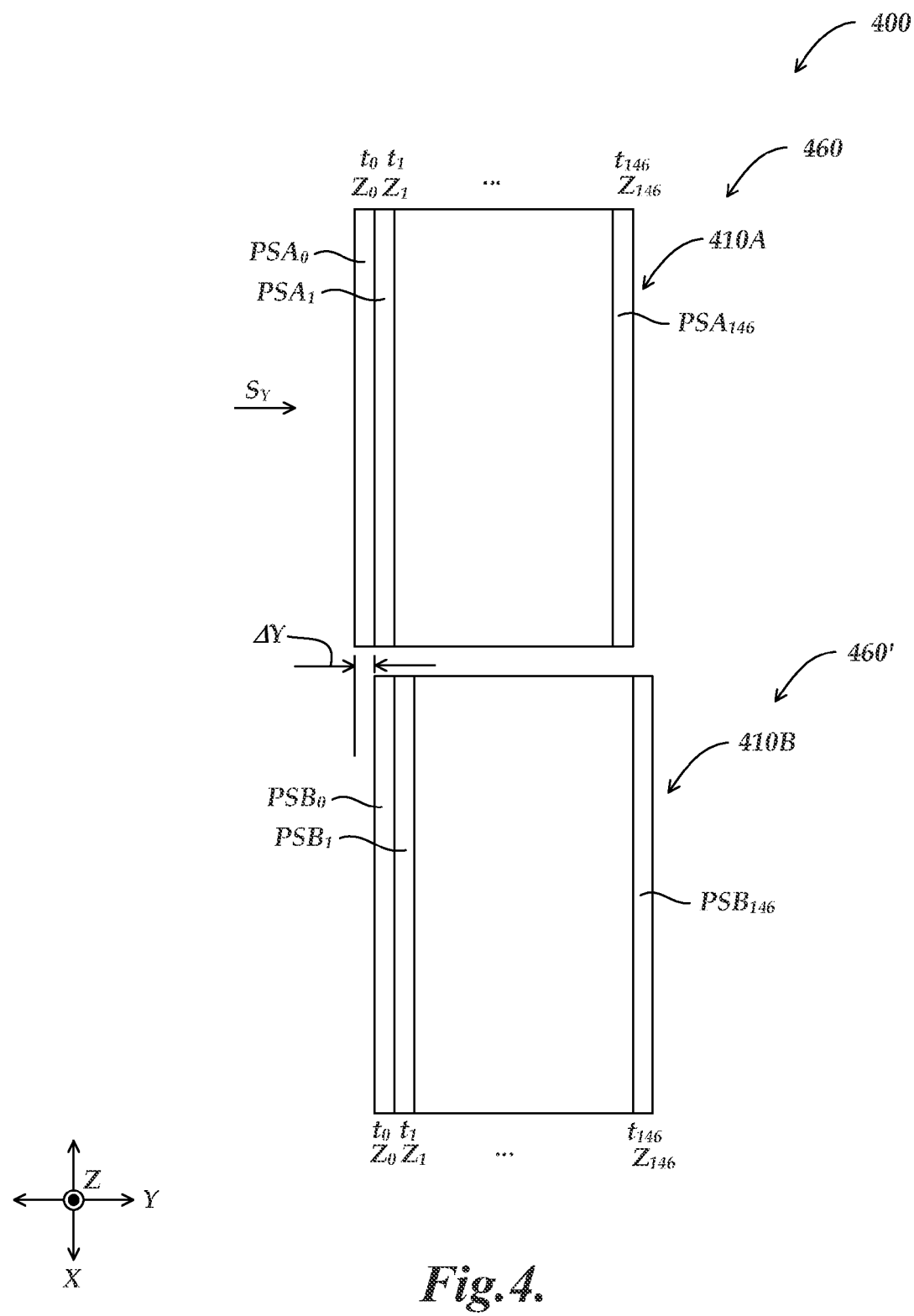
FIG. 4 is a schematic diagram of a portion of an imaging system comprising a first camera system and a second camera system.

FIG. 4 is a schematic diagram of a portion of an imaging system 400 comprising a first camera system 460 and a second camera system 460' that may be similar to the camera system 360 and the optional camera system 360' of FIG. 3. The embodiment shown in FIG. 4 is suitable for focus height measurements of a moving field of view relative to a workpiece. The first camera system 460 and the second camera system 460' are configured for moving a field of view in a direction parallel to a pixel orientation of the each camera system with a speed $S_Y$ and collecting images of an image stack as the workpiece moves. The first camera system 460 comprises an imaging array 410A and the second camera system 460' comprises an imaging array 410B, each of which is configured with an electronic rolling shutter system and has a resolution of 1280 pixels in the X direction and 1024 pixels in the Y direction. Each electronic rolling shutter system is configured to sweep the imaging array 410A and an imaging array 410B along the Y direction in order to collect an image stack.

Although in FIG. 4, the imaging array 410A and the imaging array 410B are juxtaposed, it should be appreciated that this is to schematically show their Y offset ΔY in the Y direction relative to an image of the field of view of the imaging system 300. The imaging array 410A and the imaging array 410B are actually in separate beam paths in an analogous manner to that shown in FIG. 3 with respect to the first camera system 360 and the second camera system 360'. The embodiment shown in FIG. 4 comprises two camera systems. However, embodiments configured according to similar principles may comprise more than two camera systems. In such embodiments, the offset ΔY is equal to the width of the sub-regions used for determining a best focus height. The number of camera systems can reduce the Y-pitch between stack locations. In an exemplary embodiment, an imaging system comprises seven imaging arrays, each of the imaging arrays is configured to image light offset relative to each other in a staggered manner by the offset ΔY that is at least equal to a width of the sub-regions used for determining a best focus height. Thus for focus operations utilizing 7×7 pixel sub-regions ΔY is equal to the width of seven pixels.

With focus measurement operations using an electronic rolling shutter system on a moving workpiece, an image stack collected by the imaging array 410A and 410B comprises sub images corresponding to pixel stripes numbered $PSA_N$ and $PSB_N$ rather than images that use an entire pixel array. The pixel stripes $PSA_N$ and $PSB_N$ each have widths that are the same number of pixels as the sub-regions used for determining focus metrics. For example, in the exemplary embodiment shown in FIG. 4, the pixel stripes $PSA_N$ and $PSB_N$ are seven pixels wide and the sub-regions used for determining focus metrics are 7×7 pixels. Image stacks collected by the imaging array 410A and the imaging array 410B thus include 146 images that are 7×1280 pixels. Each of the images corresponds to a Z height $Z_N$, i.e., the variable focal length lens is focused at that respective Z height in its phase of modulation corresponding to the times $t_N$.

In the exemplary embodiment shown in FIG. 4, the imaging system 400 comprises two imaging arrays. However, in various embodiments an imaging system configured according to similar principles may have only one imaging array or more than two imaging arrays. Multiple imaging arrays improve the measurement volume in the Y direction. For example, using the same parameters described with respect to FIG. 4, a camera system comprising a single imaging array may have a measurement volume of 1.331×0.007×0.292 mm³, and an imaging system comprising two imaging arrays (separated by seven pixels in the Y direction) may have a measurement volume of 1.331×0.014×0.292 mm³. An imaging system comprising N imaging arrays (staggered by seven pixels in the Y direction) may have a measurement volume of 1.331×(0.007*N)×0.292 mm³. Multiple imaging arrays also improve measurement pitch in the Y direction. In one exemplary embodiment, the workpiece may be moved relative to the field of view of the imaging system 300 at a speed in the Y direction $S_Y$ that is at least 5 mm/s and at most 39 mm/s. Thus using the same parameters described with respect to FIG. 4, a camera system comprising a single imaging array may have a measurement pitch between 0.132 mm and 1.057 mm, and an imaging system comprising two imaging arrays (separated by seven pixels in the Y direction) may have a measurement pitch between 0.067 mm and 0.53 mm. An imaging system comprising N imaging arrays (staggered by seven pixels in the Y direction) may have a measurement pitch between 0.132/N mm and 1.057/N mm. A machine vision inspection system configured using the same parameters described with respect to FIG. 4 may provide measurement resolutions in X, Y, and Z directions of 0.001 mm, 0.002 mm, and 0.002 mm, respectively. In comparison, an exemplary laser triangulation system such as the Micro-Epsilon Scancontrol 2800-10 may provide resolutions in X and Z directions of 0.040 mm and 0.004 mm, respectively. The Y resolution of an exemplary embodiment is coarser. However, for $S_Y$ between 5 mm/s and 39 mm/s, the 2800-10 system provides a measurement pitch in the Y direction that is at least 0.015 mm.

Figure 5A:
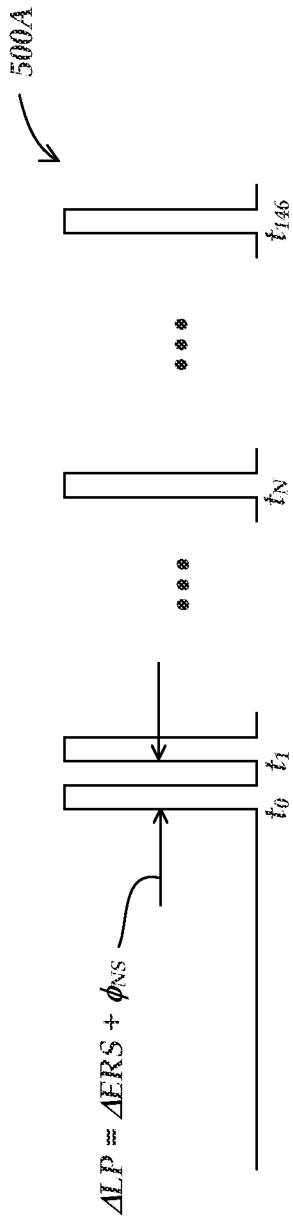
FIG. 5A is a timing diagram showing light pulses of an illumination portion.
Figure 5B:
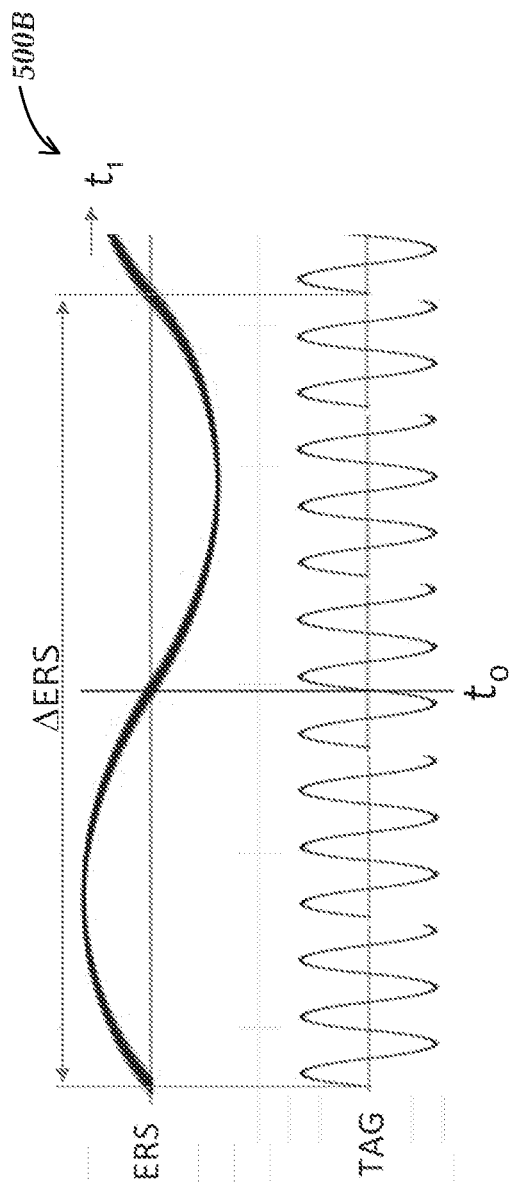
FIG. 5B is a timing diagram showing a scanning duration of an electronic rolling shutter over a set of pixels corresponding to the size of a respective focus ROI.

FIG. 5A is a timing diagram showing light pulses of the illumination portion 330. FIG. 5B is a timing diagram showing a scanning duration of an electronic rolling shutter over a set of pixels corresponding to the size of a respective focus ROI. The illumination portion 330 provides strobed illumination for each image exposure of an image stack. The strobed illumination is driven at a frequency that matches the periodically modulated focus position of the imaging system. In exemplary embodiments characterized by FIGS. 5A and 5B, the variable focal length lens 370 is modulated sinusoidally. The light pulses are timed with a duration $\Delta LP_N$ between each respective Nth pulse (e.g., between the time $t_0$ and the time $t_1$). In embodiments wherein the camera system 360 comprises an electronic rolling shutter, the electronic rolling shutter scans a portion of the pixel array(s) that is equal to a sub-region of a focus ROI size over a duration $\Delta ERS$. The light pulses are timed to coincide with a phase $\phi_{NS}$ of the modulation of the variable focal length lens 370 such that each full image in an image stack matches the appropriate focus height. The duration $\Delta LP$ is thus the sum of the duration $\Delta ERS$ and the phase $\phi_{NS}$ of each respective light pulse. For a variable focal length lens that modulates at a frequency of 72 kHz and an imaging array operating at 30 frames per second, an image stack of 146 images corresponds to 2,400 cycles of the variable focal length lens.

Figure 6:
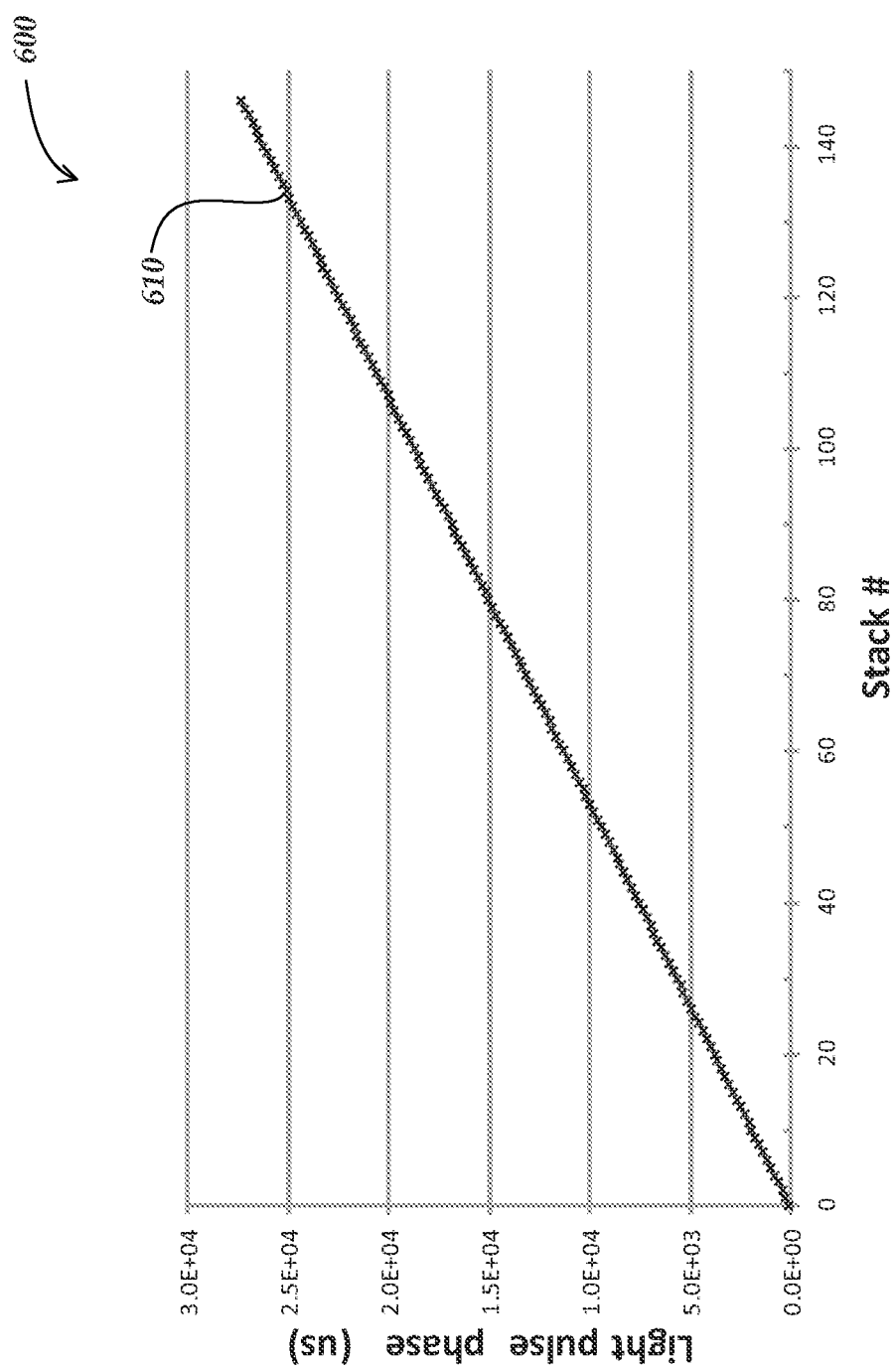
FIG. 6 is a chart showing a plot relating a time of light pulses corresponding to images ordered by an image stack number within an image stack of 146 images collected by an exemplary machine vision inspection system adapted to the principles disclosed in the embodiments of FIGS. 4 and 5.

FIG. 6 is a chart 600 showing a plot 610 relating a time of light pulses corresponding to images ordered by an image stack number within an image stack of 146 images collected by an exemplary machine vision inspection system adapted to the principles disclosed in the embodiments of FIGS. 4 and 5. In the exemplary embodiment shown in FIG. 6, the duration $\Delta ERS$ is 186.667 microseconds. Each respective phase $\phi_{NS}$ is incremented in steps of 0.091 microseconds throughout the cycle of the variable focal length lens 370. Each pulse is timed to coincide with the middle of the ERS cycle plus the respective phase $\phi_{NS}$, i.e., they are timed at a delay of 93.333 microseconds plus the respective phase $\phi_{NS}$ from when the ERS begins to sweep a respective pixel stripe.

Figure 7:
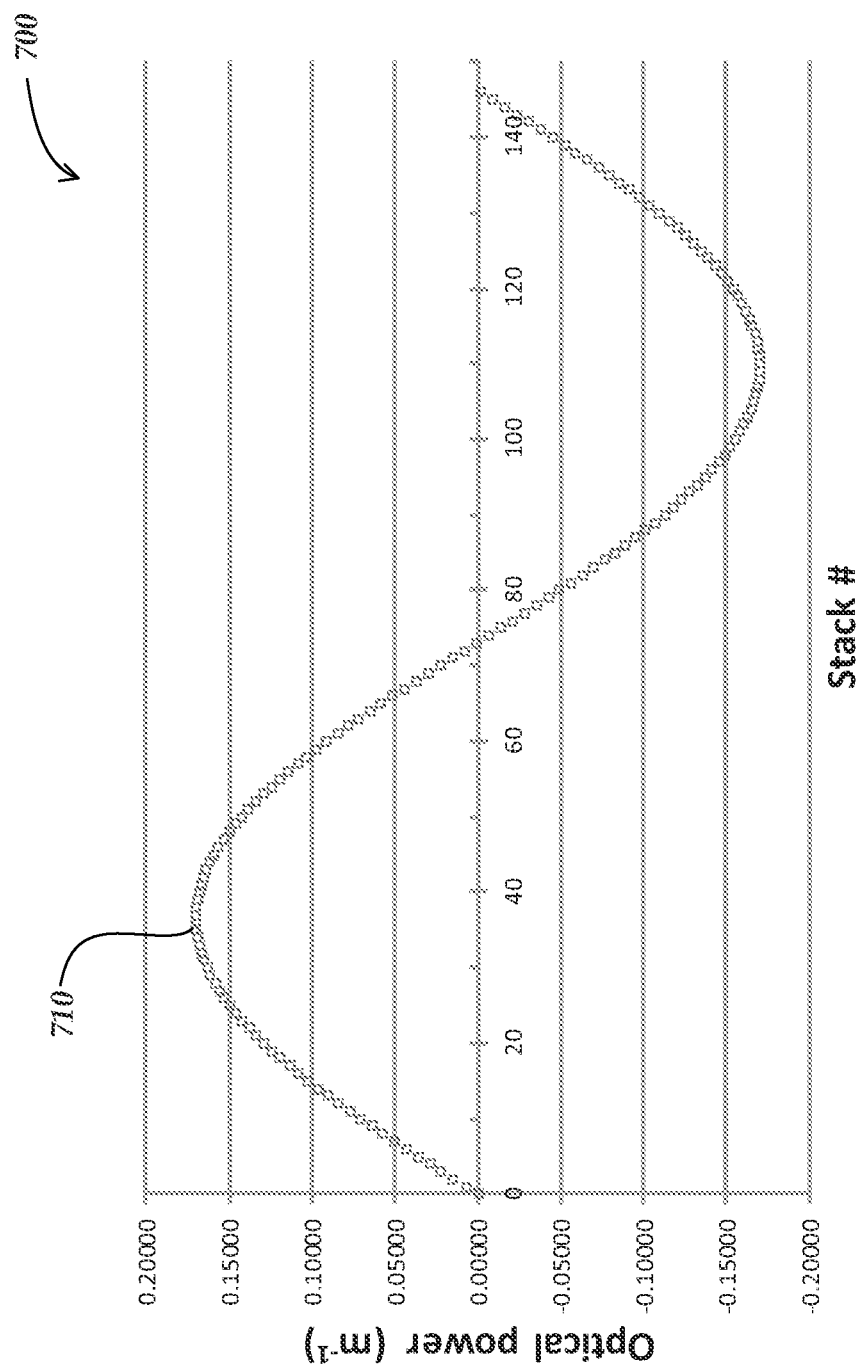
FIG. 7 is a chart showing a plot that relates the optical power of a variable focal length lens in an imaging system of a machine vision inspection system configured according to the embodiments of FIGS. 4, 5, and 6 with an image stack number within an image stack of 146 images.

FIG. 7 is a chart 700 showing a plot 710 that relates the optical power of a variable focal length lens in an imaging system of a machine vision inspection system configured according to the embodiments of FIGS. 4, 5, and 6 with an image stack number within an image stack of 146 images. In the embodiment characterized by FIG. 7, a variable focal length lens is modulated sinusoidally. As indicated by the plot 710, the optical power of the imaging system varies sinusoidally with respect to the order of images in an image stack represented by the stack number on the horizontal axis. The optical power varies between values of +/−0.17 m$^{-1}$.

Figure 8:
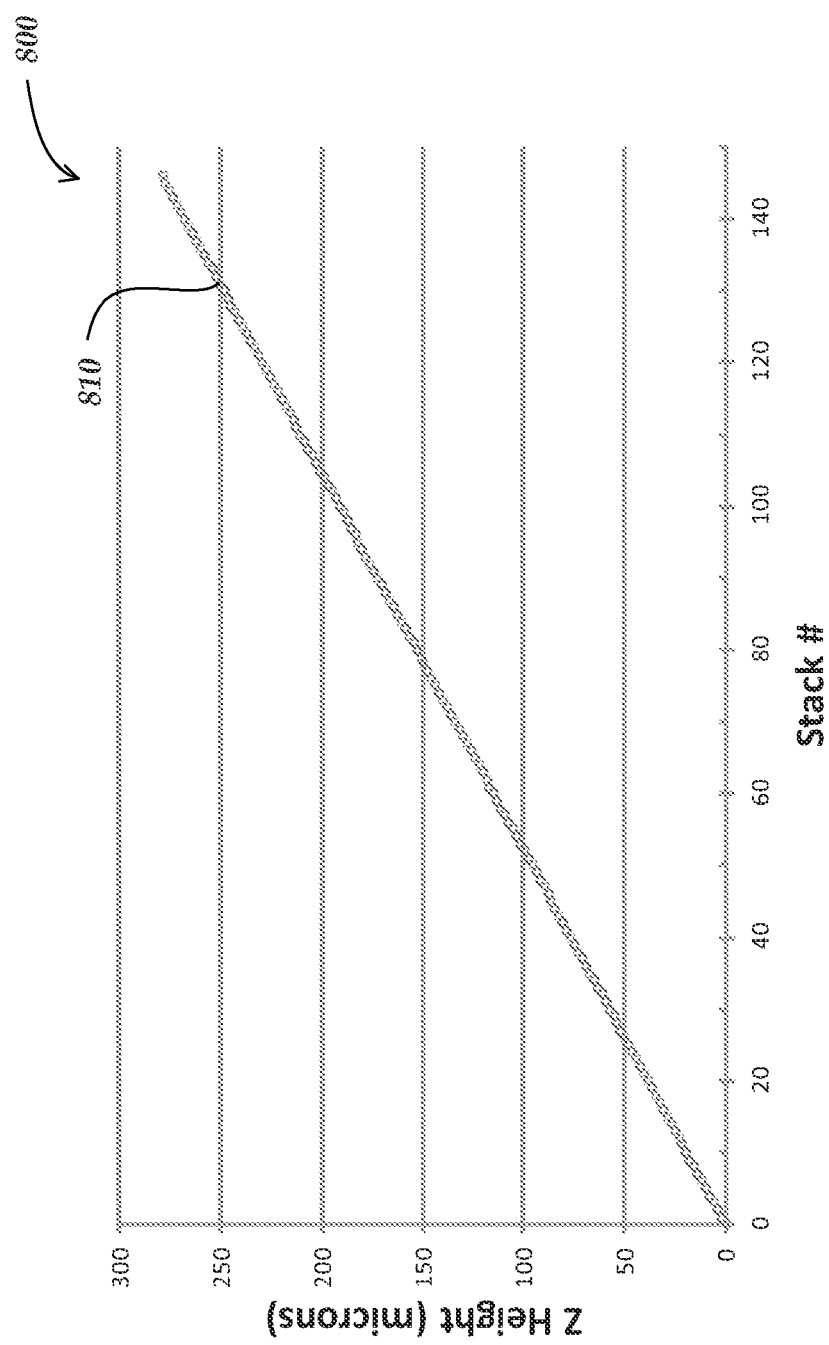
FIG. 8 is a chart showing a plot that relates a Z height corresponding to an image stack number within an image stack of 146 images collected by an exemplary machine vision inspection system adapted to the principles disclosed in FIGS. 4, 5, 6, and 7.

FIG. 8 is a chart 800 showing a plot 810 that relates a Z height corresponding to an image stack number within an image stack of 146 images collected by an exemplary machine vision inspection system adapted to the principles disclosed in FIGS. 4, 5, 6, and 7. Each of the images characterized by the plot 810 is timed to match the phase of the modulation of the variable focal length lens corresponding to the appropriate Z height given by the modulation of the variable focal length lens 370. In the embodiment characterized by FIG. 8, the image stack corresponds to a Z-height range of 290 μm.

Figure 9:
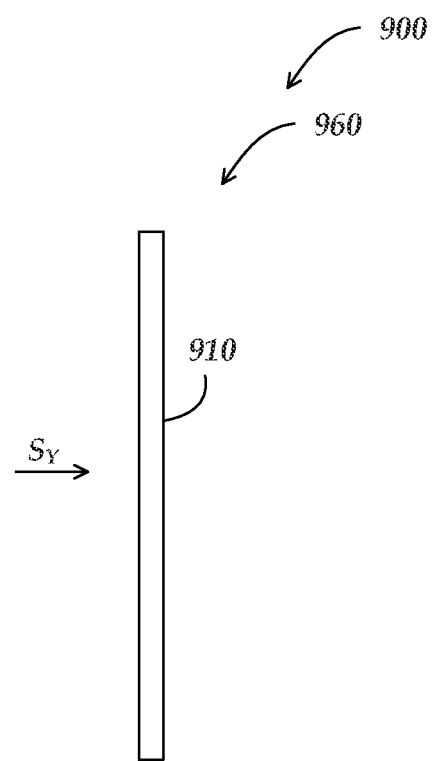
FIG. 9 is a schematic diagram of a portion of an imaging system comprising a camera system.
Figure 9:
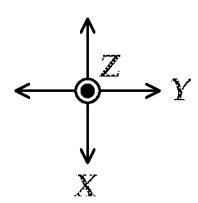

FIG. 9 is a schematic diagram of a portion of an imaging system 900 comprising a camera system 960. The camera system 960 comprises an imaging array 910 that is a one-dimensional line sensor, rather than a two-dimensional imaging array. With the exception of the imaging array 910, the imaging system 900 may be similar to the imaging system 300 shown in FIG. 3. Like the imaging system 400 shown in FIG. 4, the imaging system 900 is suitable for a field of view moved relative to a workpiece with a speed $S_y$. A two-dimensional imaging array places a lower limit on the range R shown in FIG. 3. For a two-dimensional array, the range R is limited by the minimum duration of strobed light and the number of rows in the imaging array. However, a one-dimensional array is only limited by the duration of the strobed light.

An exemplary sensor that may be suitable for the imaging array 910 is model P4-CM-02K10D-00-R from Teledyne Dalsa of Waterloo, Ontario, Canada, that comprises an array which has a width of 2048 pixels and a line rate of 140 kHz.

This sensor comprises two lines of pixels that may be summed or used independently of one another. Similar sensors with a single line of pixels are also available and suitable for the embodiment shown in FIG. 9.

In some exemplary embodiments, an inexpensive light source may have a light pulse duration of 50 ns and a focus modulation rate of 72 kHz that is capable of 278 timing increments for collecting an image stack. Such an embodiment may have a range R of approximately 100 depths of focus of the imaging system 900. In some exemplary embodiments, an advanced light source may have a light pulse duration of 2 ns and a focus modulation rate of 72 kHz that is capable of 6,950 timing increments for collecting an image stack. Such an embodiment may have a range R of approximately 2,500 depths of focus of the imaging system 900.

It should be appreciated that a one-dimensional imaging array with a line rate of 140 kHz or a higher line rate of 280 kHz is capable of collecting an image stack through a single cycle of a typical tunable acoustic gradient index of refraction lens operating at 72 kHz. A machine vision inspection system configured using the same parameters described with respect to FIG. 9 with a field of view moving at a comparable speed compared to the imaging system 400 of $S_y$=33 mm/sec, may provide measurement resolutions in X, Y, and Z directions of 0.001 mm, 0.010 mm, and 0.002 mm, respectively.

Figure 10:
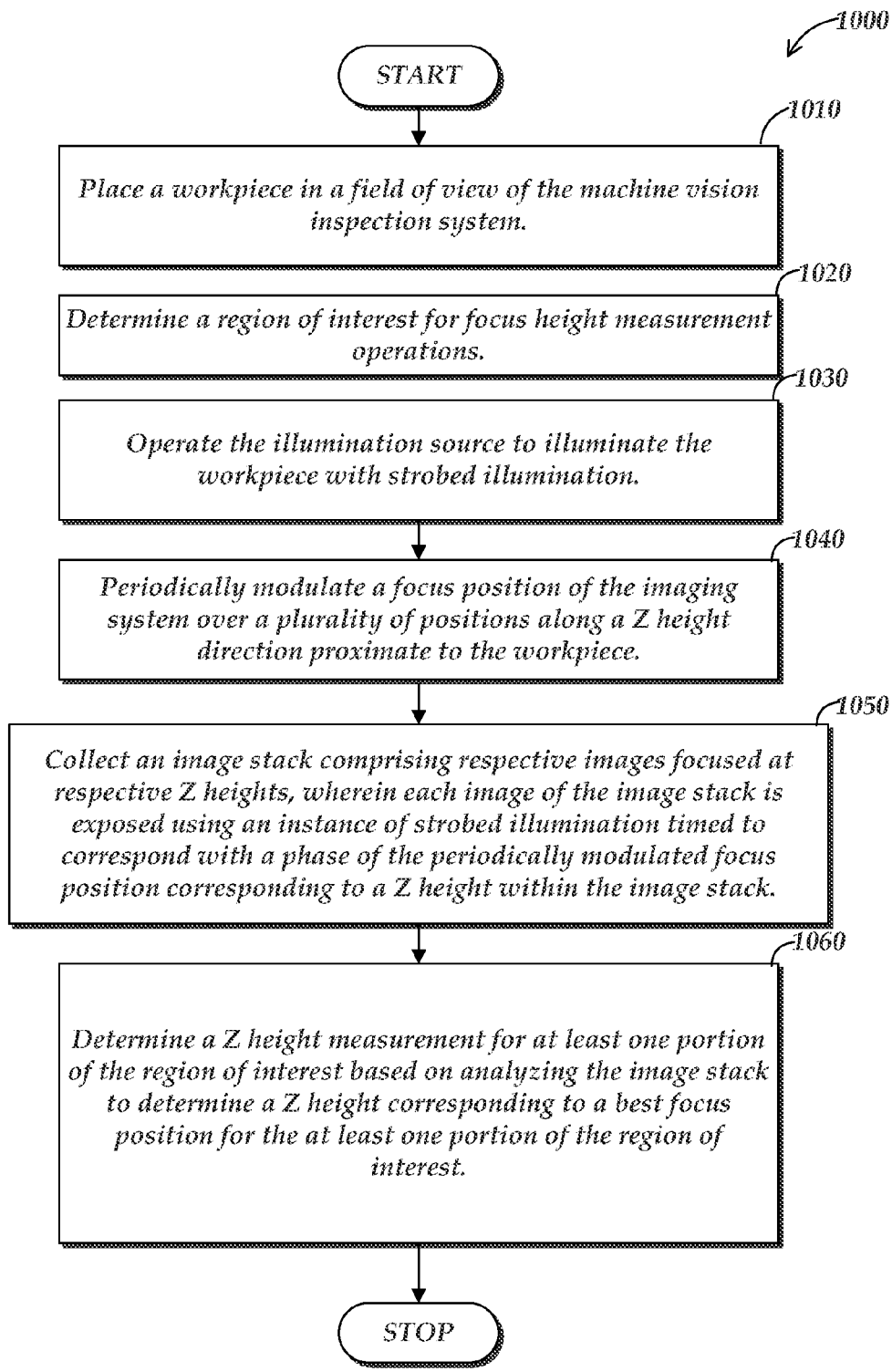
FIG. 10 is a flow diagram showing a method for performing high-speed autofocus operations in a machine vision inspection system.

FIG. 10 is a flow diagram 1000 showing a method for performing high-speed focus operations in a machine vision inspection system. The machine vision inspection system comprises an illumination source and an imaging system that comprises a variable focal length lens and a camera system.

At block 1010, a workpiece is placed in a field of view of the machine vision inspection system.

At block 1020, a region of interest is determined for focus height measurement operations.

At block 1030, the illumination source is operated to illuminate the workpiece with strobed illumination.

At block 1040, a focus position of the imaging system is periodically modulated over a plurality of positions along a Z-height direction proximate to the workpiece.

At block 1050, an image stack is collected comprising respective images focused at respective Z heights, wherein each image of the image stack is exposed using an instance of strobed illumination timed to correspond with a phase of the periodically modulated focus position corresponding to a Z height within the image stack.

At block 1060, a Z-height measurement is determined for at least one portion of the region of interest based on analyzing the image stack to determine a Z height corresponding to a best focus position for the at least one portion of the region of interest. In some embodiments, the at least one portion of the region of interest may be a sub-region of the region of interest. In some embodiments, the at least one portion of the region of interest may be the entire region of interest. In some embodiments, determining a Z-height measurement for at least one portion of the region of interest may comprise determining a Z-height measurement for a plurality of sub-regions of the region of interest.

It should be appreciated that embodiments of a machine vision inspection system configured according to the principles disclosed herein provide certain advantages over laser triangulation-based systems. For example, such systems produce no laser speckle and thus no eye safety hazard. Through the lens, measurement is possible (e.g., in the embodiment shown in FIG. 3), which means there is no potential obstruction or shadowing. Furthermore, components such as the illumination source, CMOS imaging arrays, and the required support electronics are inexpensive.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for performing high-speed focus height measurement operations in a machine vision inspection system comprising an illumination source and an imaging system that comprises a camera system, the method comprising:
    placing a workpiece in a field of view of the machine vision inspection system;
    determining a region of interest for focus height measurement operations;
    operating the illumination source to illuminate the workpiece with strobed illumination;
    periodically modulating a focus position of the imaging system over a plurality of positions along a Z-height direction proximate to the workpiece;
    collecting an image stack comprising respective images focused at respective Z heights, wherein each image of the image stack is exposed using an instance of strobed illumination timed to correspond with a phase of the periodically modulated focus position corresponding to a Z height within the image stack; and
    determining a Z-height measurement for at least one portion of the region of interest based on analyzing the image stack to determine a Z height corresponding to a best focus position for the at least one portion of the region of interest.

2. The method of claim 1, wherein the imaging system comprises a variable focal length lens and periodically modulating a focus position of the imaging system comprises modulating a focus position of a variable focal length lens.

3. The method of claim 2, wherein the variable focal length lens is a tunable acoustic gradient index of refraction lens.

4. The method of claim 2, wherein periodically modulating a focus position of the imaging system comprises modulating a focus position at a rate of at least 10 kHz.

5. The method of claim 1, wherein modulating a focus position of a variable focal length lens comprises sinusoidally modulating the focus position.

6. The method of claim 1, wherein illuminating the workpiece with strobed illumination comprises driving the strobed illumination at a frequency that matches the periodically modulated focus position of the imaging system and adding a phase shift timed to correspond to a Z height.

7. The method of claim 1, further comprising moving a field of view relative to a workpiece along a direction of motion parallel to a pixel orientation of the camera system and collecting images of the image stack as the field of view moves, wherein the imaging system comprises a camera system with an electronic rolling shutter and each image of the image stack is a stripe of the pixel array with a width along the direction of motion equal to the at least one portion of the region of interest.

8. The method of claim 7, wherein the imaging system comprises a plurality of camera systems comprising imaging arrays which receive image light offset relative to each other in a staggered manner by a distance at least equal to a width of the at least one portion of the region of interest used for determining a best focus height.

9. The method of claim 1, wherein the at least one portion of the region of interest is a sub-region of the region of interest.

10. The method of claim 1, wherein the at least one portion of the region of interest is the entire region of interest.

11. The method of claim 1, wherein determining a Z-height measurement for at least one portion of the region of interest comprises determining a Z-height measurement for a plurality of sub-regions of the region of interest.

12. A machine vision inspection system configurable to collect a stack of images of a workpiece at a plurality of Z heights in order to measure Z heights based on a best focus height for a plurality of sub-regions of a region of interest, the machine vision inspection system comprising:
- an imaging system comprising a variable focal length lens electronically controllable to vary the focus position of the imaging system; and
- an illumination source configurable to illuminate a workpiece with strobed illumination in a field of view of the imaging system, wherein:
  - the machine vision inspection system comprises a control portion configured to:
    - periodically modulate a focus position of the variable focal length lens over a plurality of positions along a Z-height direction proximate to the workpiece; and
    - collect an image stack comprising respective images focused at respective Z heights, wherein each image of the image stack corresponds to an instance of strobed illumination timed to correspond with a phase of the periodically modulated focus position corresponding to a Z height within the image stack, and
  - the machine vision inspection system is configurable to:
    - determine a region of interest within a field of view for focus height measurement operations; and
    - determine a Z-height measurement for at least one portion of the region of interest based on analyzing the image stack to determine a Z height corresponding to a best focus position for the at least one portion of the region of interest.

13. The machine vision inspection system of claim 12, wherein the imaging system comprises a tunable acoustic gradient index of refraction lens configurable to modulate the focus position of the imaging system.

14. The machine vision inspection system of claim 12, wherein the imaging system comprises a camera system that comprises a global shutter system.

15. The machine vision inspection system of claim 14, further comprising a focus height video tool, wherein the operations of periodically modulating a focus position of the imaging system over a plurality of positions proximate to the workpiece and collecting an image stack are selectable as an optional high-speed mode of the focus height video tool.

16. The machine vision inspection system of claim 12, wherein the imaging system comprises at least one camera system that comprises an imaging array with an electronic rolling shutter system.

17. The machine vision inspection system of claim 16, wherein:
- the imaging system comprises a plurality of camera systems, each of which comprises an imaging array with an electronic rolling shutter system; and
- each of the imaging arrays is configured in a staggered manner to receive image light offset relative to each other by a distance equal to a width of the at least one portion of the region of interest used for determining a best focus position.

18. The machine vision inspection system of claim 12, wherein the camera system comprises an imaging array that is a one-dimensional line sensor.

* * * * *